US010585608B2

(12) United States Patent
Valentino et al.

(10) Patent No.: US 10,585,608 B2
(45) Date of Patent: Mar. 10, 2020

(54) SYSTEM AND METHOD FOR SECURELY ISOLATING A SYSTEM FEATURE

(71) Applicant: Oracle International Corporation, Redwood Shores, CA (US)

(72) Inventors: Ralph P. Valentino, Stow, MA (US); James A. Heck, Chelmsford, MA (US); David W. Hartwell, Lancaster, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/466,484

(22) Filed: Mar. 22, 2017

(65) Prior Publication Data

US 2018/0275904 A1 Sep. 27, 2018

(51) Int. Cl.
| G06F 12/00 | (2006.01) |
| G06F 3/06 | (2006.01) |
| G06F 21/85 | (2013.01) |
| G06F 12/14 | (2006.01) |

(52) U.S. Cl.
CPC .......... *G06F 3/0634* (2013.01); *G06F 3/0622* (2013.01); *G06F 3/0656* (2013.01); *G06F 3/0659* (2013.01); *G06F 3/0673* (2013.01); *G06F 3/0679* (2013.01); *G06F 12/1433* (2013.01); *G06F 21/85* (2013.01); *G06F 2212/1052* (2013.01)

(58) Field of Classification Search
CPC ...... G06F 12/1425; G06F 21/79; G11C 16/22
See application file for complete search history.

(56) References Cited

U.S. PATENT DOCUMENTS

| 8,392,683 | B1 * | 3/2013 | Confalonieri | ....... G06F 12/0246 |
| | | | | 711/103 |
| 9,521,032 | B1 * | 12/2016 | Worsley | .................. H04L 41/00 |
| 2006/0242425 | A1 * | 10/2006 | Ishida | .................. G06F 12/1433 |
| | | | | 713/183 |
| 2008/0126735 | A1 * | 5/2008 | Kang | .................. G11C 11/5621 |
| | | | | 711/170 |
| 2008/0155217 | A1 * | 6/2008 | Kato | .................... G06F 12/1425 |
| | | | | 711/163 |
| 2014/0044265 | A1 * | 2/2014 | Kocher | .................. H04L 9/083 |
| | | | | 380/277 |
| 2015/0242140 | A1 * | 8/2015 | Hung | .................... G06F 3/0688 |
| | | | | 711/103 |
| 2016/0047142 | A1 * | 2/2016 | Gengler | ............. G07C 9/00571 |
| | | | | 340/5.61 |
| 2016/0283419 | A1 * | 9/2016 | Yasumoto | ............... G06F 13/20 |

* cited by examiner

*Primary Examiner* — Arvind Talukdar
(74) *Attorney, Agent, or Firm* — Invoke (57) ABSTRACT

Operations include isolating one or more system features. A system stores a set of signal states, comprising a signal state for each system feature. Hardware of the system is configurable to a lockdown state, in which the set of signal states cannot be modified. The hardware of the system is also configurable to a non-lockdown state, in which the set of signal states can be modified. Hardware logic configures functionality of the set of system features based on the signal states.

13 Claims, 4 Drawing Sheets

SYSTEM AND METHOD FOR SECURELY ISOLATING A SYSTEM FEATURE

TECHNICAL FIELD

The present disclosure relates to computer security. In particular, the present disclosure relates to selective isolation of one or more system features.

BACKGROUND

A computing system includes many components and features. Components include interfaces such as a universal serial bus (USB), hardware such as non-volatile memory, and integrated devices, such as management controllers used for remote server management. Features include a part or a state of a component, such as whether the component is turned on or off, whether the component is held in reset, or whether the component may access a clock.

Each of these components and features may be seen as a potential vector of attack, from which an unauthorized entity may remotely enter and modify the system. Some of these components may be highly desirable for one user, and specifically disallowed by another user due to security concerns. For instance, one user may require a USB interface, while another user cannot have a USB interface on her system for security reasons.

Software-based solutions include unloading or disabling software to a peripheral interface. For example, network stacks or drivers may be unloaded or disabled. However, software modifications may be subverted remotely or through hidden software running on the system by an unauthorized party. Regardless of the layers of protection applied, such as encryption, passwords, and driver signing, software-based solutions are susceptible to being remotely subverted. At best, software modification makes it more difficult and time-consuming to successfully penetrate a system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM IN LOCKDOWN CONFIGURATION
3. SYSTEM IN NON-LOCKDOWN CONFIGURATION
4. ISOLATING A SYSTEM FEATURE
5. REMOTE RECONFIGURATION
6. MISCELLANEOUS; EXTENSIONS
7. HARDWARE OVERVIEW

1. General Overview

One or more embodiments include selectively and securely isolating a system feature. A system includes one or more features. One or more of these features may be in a disabled state, or in an enabled state. The system can be configured into a lockdown state, wherein the disabled or enabled status of a particular system feature cannot be altered.

In an embodiment, the system includes non-volatile memory, which stores a set of signal states, comprising a signal state for each of the system features. In the lockdown state, the set of signal states cannot be modified. The system can also be configured to a non-lockdown state, in which the set of signal states can be modified. Hardware logic configures functionality of the system features, based on the signal states.

One or more embodiments described in this Specification and/or recited in the claims may not be included in this General Overview section.

2. System in Lockdown Configuration

Figure 1A:
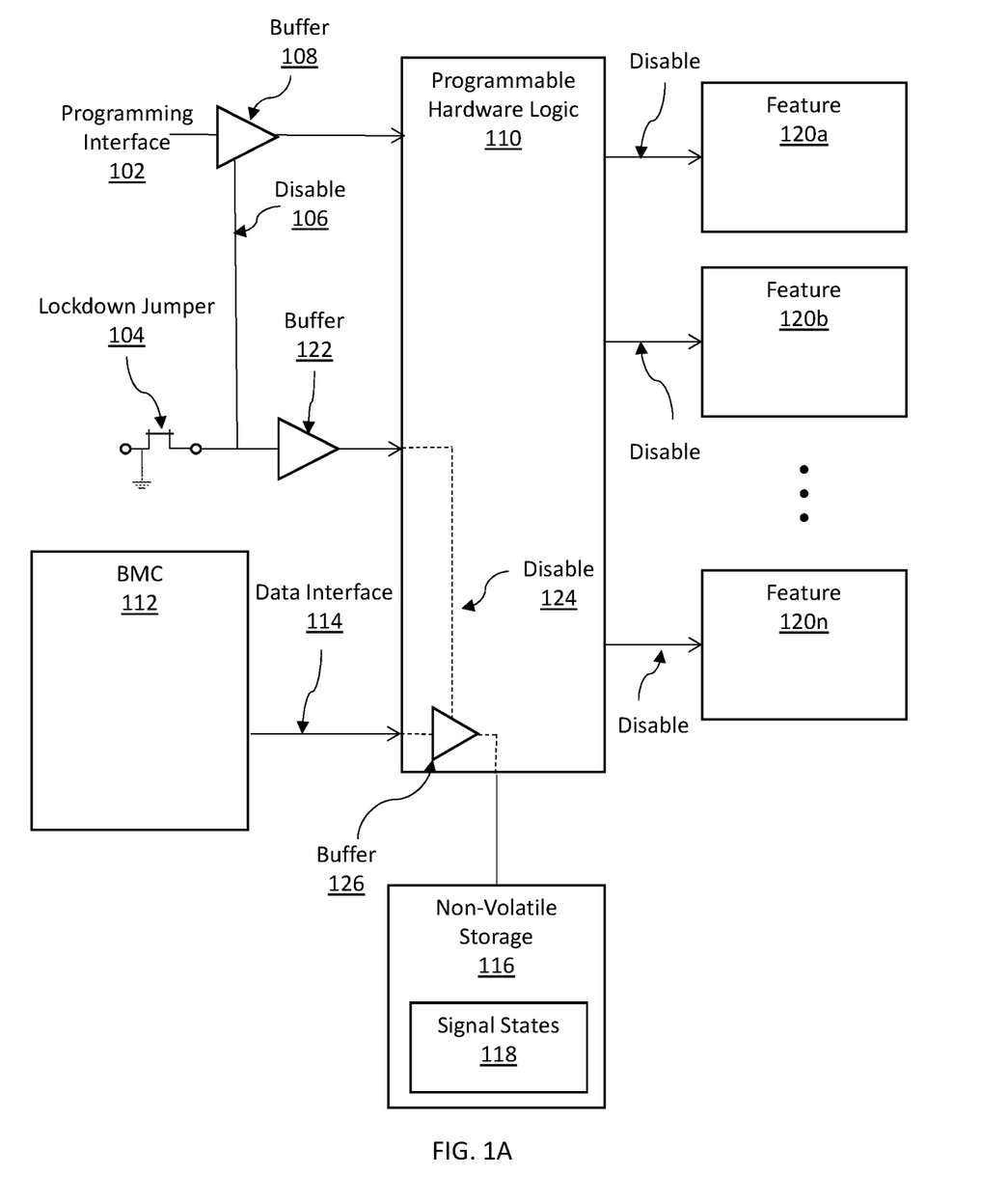
FIG. 1A illustrates a system in the lockdown state, in accordance with one or more embodiments.

FIG. 1A illustrates a system in lockdown configuration, in accordance with one or more embodiments. Programmable hardware logic 110 implements functionality based on signal states 118 stored in non-volatile storage 116. The system further includes a programming interface 102, lockdown jumper 104, baseboard management controller (BMC) 112, and features 120a-120n. The system further includes a motherboard (not pictured). In one or more embodiments, the system may include more or fewer components than the components illustrated in FIG. 1A. The components illustrated in FIG. 1A may be local to or remote from each other. The components illustrated in FIG. 1A may be implemented in software and/or hardware. Each component may be distributed over multiple applications and/or machines. Multiple components may be combined into one application and/or machine. Operations described with respect to one component may instead be performed by another component.

In one or more embodiment features (e.g., features 120a-120n) refer to a device, a part of a device, or a combination of two or more devices. Exemplary devices include a network stack, a driver, a management controller, and an expansion slot. A feature of a device includes power to the device, whether the device is in a reset state, the clock of the device, and an input or output of the device.

In one or more embodiments, the programmable hardware logic 110 corresponds to an Integrated Circuit (IC). The programmable hardware logic may be a Field Programmable Gate Array (FPGA), complex programmable logic device (CPLD), or any other type of programmable logic device (PLD).

The programmable hardware logic 110 may be communicatively coupled to features 120a-120n, programming interface 102, buffer 122, data interface 114, and non-volatile storage 116 via a direct connection or via a network. Furthermore, the programmable hardware logic 110 may be implemented or may execute on the same computing system as the BMC 112, non-volatile storage 116, and features 120a-120n. Alternatively or additionally, the programmable hardware logic 110 may be implemented or executed on a computing system separate from the BMC 112, non-volatile storage 116, and features 120a-120n. Programmable read only memory (PROM) may also perform the functions of the programmable hardware logic.

In another embodiment, hardware logic that is not programmable may be used instead of programmable hardware logic. The hardware logic may include hardened logic. Hardened logic cannot be reprogrammed, regardless of whether the system is in the lockdown state, or the non-lockdown state.

In an embodiment, the programmable hardware logic 110 includes functionality to control features 120a-120n. The programmable hardware logic may include functionality to transmit a signal to a feature, to enable or disable that feature. The programmable hardware logic may logically specify 0 (i.e., low, or not true) or 1 (i.e., high, or true). The programmable hardware logic may include functionality to map a 0 or 1 to an enable or disable signal. The configuration of the programmable hardware logic may be, at least in part, defined by signal states 118 stored in the non-volatile storage 116. The programmable hardware logic may store a mapping between a signal state 118 and the enablement of a respective feature of features 120a-120n. Additionally, the programmable hardware logic may include functionality to modify the signal states in the non-volatile storage.

In FIG. 1A, features 120a-120n are disabled, as indicated by the arrows pointing to features 120a-120n in FIG. 1A. A feature is disabled in response to a particular signal received from the programmable hardware logic. For example, the feature may be the power source of a hard drive. The programmable hardware logic may transmit a signal to disable power to the hard drive. The power to the hard drive and the hard drive itself are rendered inoperable. The features need not all be disabled, in lockdown mode or otherwise. Each device may be selectively disabled or enabled, depending on the desired security model. For example, features a and b may be enabled, and feature n may be disabled. As another example, all features may be enabled.

In an embodiment, the programming interface 102 includes hardware and/or software configured to transmit instructions for configuring the programmable hardware logic 110. The programming interface may include functionality to transmit an instruction, to the programmable hardware logic, to modify the hardware logic of the programmable hardware logic. The programming interface may be any type of interface, including, but not limited, to a serial bus (e.g., Joint Test Action Group (JTAG) bus), a parallel interface, or a general-purpose input/output (GPIO).

The programming interface may connect to a processing unit containing code including instructions for configuring the programmable hardware logic. Additionally or alternatively, the programming interface may be communicatively coupled to receive user input. User input may be received from, for instance, a command line for receiving code, or an application programming interface (API).

In an embodiment, the non-volatile storage 116 includes functionality to store a set of signal states. The non-volatile storage retains contents even when the system powers off. Therefore, even if the system is powered off and on, the settings stored in the non-volatile storage 116 will be preserved. The non-volatile storage 116 may be, for example read-only memory (ROM), programmable read-only memory (PROM), flash memory, a hard disk drive, or magnetic tape. The non-volatile storage 116 is directly connected to the programmable hardware logic 110 only, and otherwise isolated from the system. The non-volatile storage 116 can only be modified by the programmable hardware logic 110.

In an embodiment, the signal states 118 are stored to the non-volatile storage 116. A signal state is a discrete value possible for a given signal. The signal states may be stored as an enabling/disabling table. An enabling/disabling table stores settings, to be used to determine whether to enable or disable a particular feature. A signal state may be, for example, a 1 (high) or a 0 (low). The programmable hardware logic may modify a signal state. As the non-volatile storage holding the signal states is only coupled to the programmable hardware logic, and otherwise isolated from the system, a signal state cannot be modified without instructions from the programmable hardware logic.

In an embodiment, the BMC 112 is a controller that includes functionality to program the non-volatile storage 116 through the programmable hardware logic 110. The BMC includes functionality to monitor and manage the system, by performing functions such as power control, detecting failures, and sending alerts. The BMC may detect a failure in a system feature, and resultantly reprogram the signal states to disable that feature. The BMC is coupled to the programmable hardware logic 110 via data interface 114. In lieu of a BMC, an external controller or host could be used to program the non-volatile storage.

In an embodiment, the data interface 114 is a communication interface that allows the BMC 112 to change data in the programmable hardware logic 110. The data interface may transmit an instruction, to the programmable hardware logic, to modify one or more signal states 118 stored in the non-volatile storage 116. The data interface may be any type of interface, including, but not limited, to a serial bus (e.g., Inter-Integrated Circuit ($I^2C$)), a parallel interface, or a general-purpose input/output (GPIO).

In an embodiment, the lockdown jumper 104 is a short length of conductor that may be inserted to connect two pins on the motherboard. The lockdown jumper may be inserted or removed from the motherboard, closing or opening a circuit. In FIG. 1A, the lockdown jumper is in place. When the lockdown jumper is inserted, the system is in lockdown mode. With the lockdown jumper in place, a 0 (low) signal is transmitted. Alternatively, the system may be configured so that a 1 (high) signal is be transmitted when the lockdown jumper is in place. Whichever signal is configured to be sent with the lockdown jumper in place, that signal is programmed to mean disable. The disable signal cannot be modified by any software running on the system. The disable signal can only be modified by physically removing the lockdown jumper. Disable signals 106, 124 are transmitted when the lockdown jumper is in place.

Disable signal 106 controls an isolation buffer 108. The programming interface 102 connects to the programmable hardware logic 110 through isolation buffer 108. The disable signal prevents the programming interface from modifying the contents of the programmable hardware logic. Disable 106 can only be controlled through the lockdown jumper. The lockdown jumper physically breaks the programming interface, isolating the programmable hardware logic. There is an electrical isolation of the programming interface when the lockdown jumper is in place.

The disable signal 106 is a signal transmitted from the lockdown jumper to the programming interface 102 via buffer 108. Disable signal 106 disables the programming interface from communicating with and/or configuring the programmable hardware logic. The disable signal may prevent communication by deactivating necessary power and/or connections. When the lockdown jumper is present, the programming interface cannot modify the programmable hardware logic.

Disable 124 is a signal transmitted from the lockdown jumper into the programmable hardware logic 110, via buffer 122. Disable 124 is sent to the input of the programmable hardware logic 110 to the data interface 114. When the disable signal is active, the data interface is logically isolated from modifying the signal states 118. Disable 124 prevents the BMC from modifying the non-volatile storage, by blocking communications sent to the portion of the programmable hardware logic 110 that has access to the signal states 118. As a result, the non-volatile storage is write-protected. The disable signal may only disable the data interface from writing, not from reading. In this case, the BMC can still read values stored in the non-volatile storage, but cannot modify any values therein.

Buffer 122 is a one-way buffer that includes functionality to prevent back-driving from the programmable hardware logic 110. The buffer 122 prevents signals from the programmable hardware logic from altering the signal from the lockdown jumper. The buffer 122 may further include functionality to temporarily store data as the data is transmitted to the programmable hardware logic.

Another buffer, buffer 126 is positioned inside the programmable hardware logic 110. Buffer 126 acts as a logic buffer. Buffer 126 may be a one-way buffer, and prevent back-driving. Buffer 126 includes functionality to preventing the programmable hardware logic from modifying the disable signal. Buffer 126 may further include functionality to temporarily store data as the data is transmitted to and/or from the programmable hardware logic.

3. System in Non-Lockdown Configuration

Figure 1B:
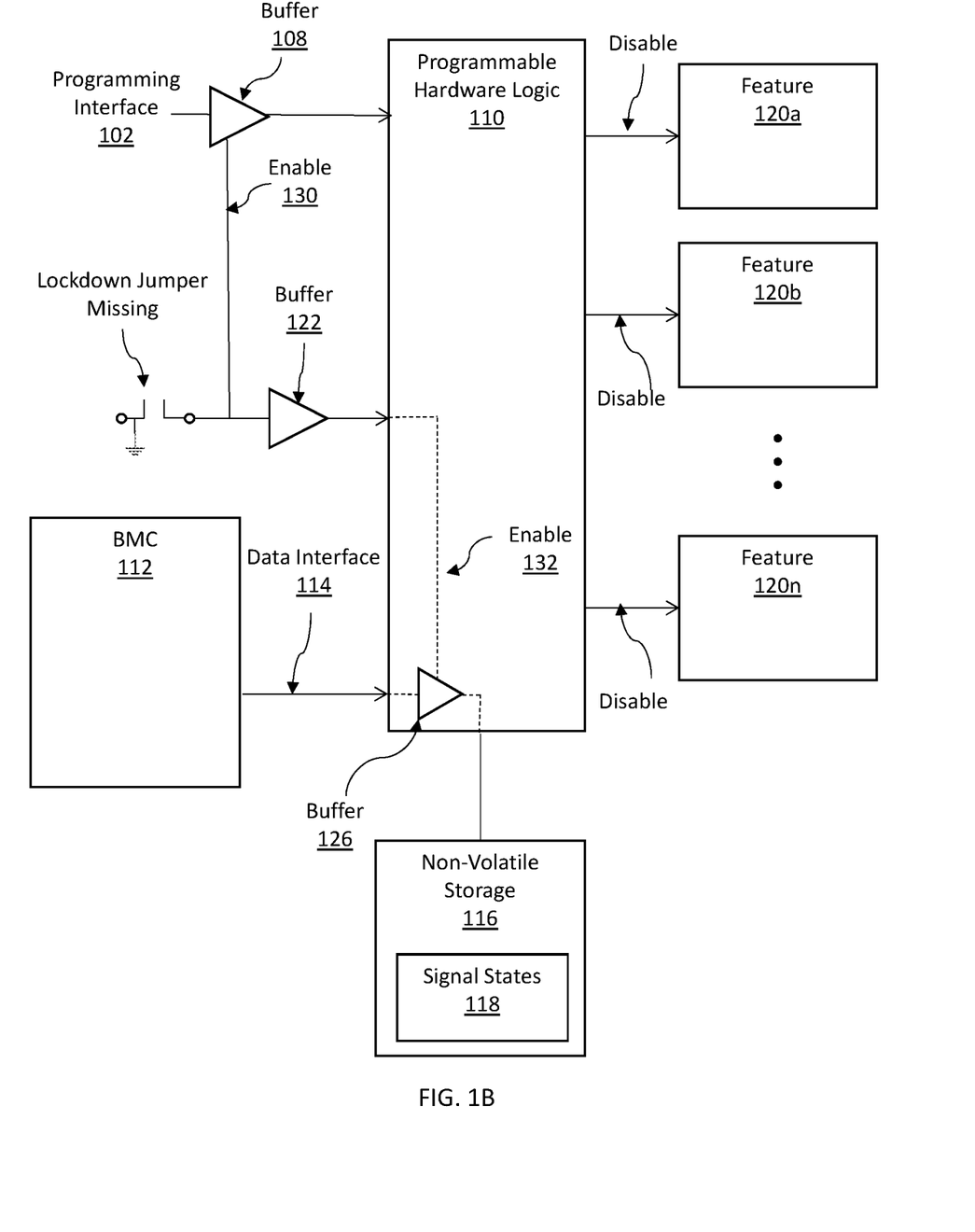
FIG. 1B illustrates a system in the non-lockdown state, in accordance with one or more embodiments.

FIG. 1B illustrates a system in non-lockdown configuration, in accordance with one or more embodiments. The programming interface 102; BMC 112; data interface 114; buffers 108, 122, 126; programmable hardware logic 110; non-volatile storage 116; signal states 118; and features 120a-120n are described above in Section 2 with reference to FIG. 1A, however, may be implemented differently or operate differently as noted below. In FIG. 1B, the system is in the non-lockdown state. The lockdown jumper is not inserted in the non-lockdown state. The components illustrated in FIG. 1B may be local to or remote from each other. The components illustrated in FIG. 1B may be implemented in software and/or hardware. Each component may be distributed over multiple applications and/or machines. Multiple components may be combined into one application and/or machine. Operations described with respect to one component may instead be performed by another component.

When the lockdown jumper is not inserted, the system is in non-lockdown mode. With the lockdown jumper missing, the system transmits a 1 (high) signal. Alternatively, the system may transmit a 0 (low) signal when the lockdown jumper is in not place. In either case, the respective 0 or 1 corresponds to an enable signal. Without the lockdown jumper in place, the system generates enable signals 130, 132.

The enable signal 130 is a signal transmitted from the lockdown jumper to the programming interface 102 via buffer 108. Enable signal 130 enables the programming interface to communicate with and/or configure the programmable hardware logic. The enable signal may permit communication by activating necessary power and/or connections. When the lockdown jumper is missing, the programming interface can modify the programmable hardware logic.

Enable 132 is a signal transmitted from the lockdown jumper into the programmable hardware logic 110 via buffer 122. The enable signal 132 causes the data interface 114 to be enabled. The enable signal may enable the data interface by activating necessary power and/or connections. The BMC, via data interface 114, may both read and write to the non-volatile storage via programmable hardware logic 110. When the lockdown jumper is not inserted, the programmable hardware logic can modify the signal states in the non-volatile storage.

4. Isolating a System Feature

Figure 2:
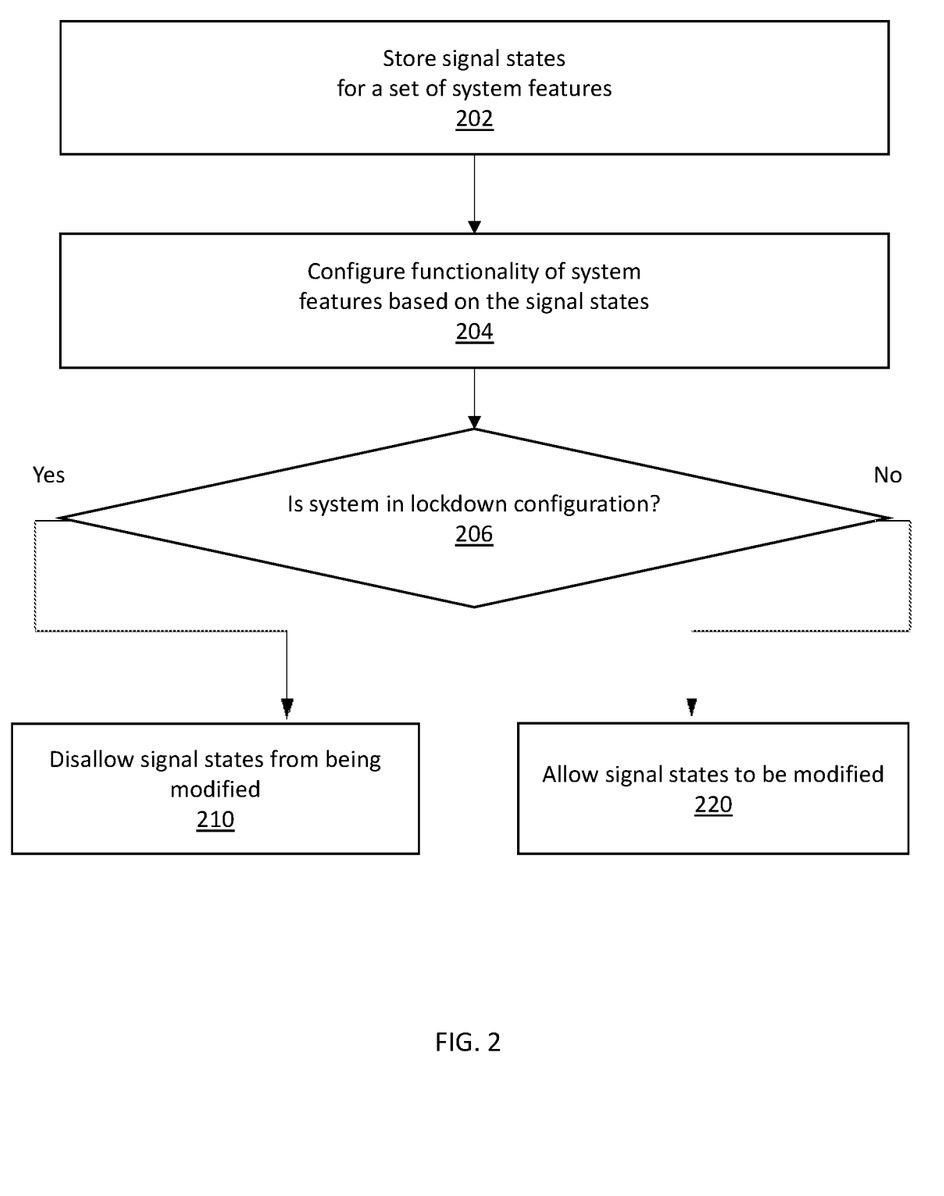
FIG. 2 illustrates an example set of operations for modifying a set of signal states in accordance with one or more embodiments.

FIG. 2 illustrates an exemplary set of operations for isolating a system feature, in accordance with one or more embodiments. One or more operations illustrated in FIG. 2 may be modified, rearranged, or omitted altogether. Accordingly, the particular sequence of operations illustrated in FIG. 2 should not be construed as limiting the scope of one or more embodiments.

In an embodiment, the system stores signal states, for a set of system features (Operation 202). The signal states may be stored in the non-volatile storage by modifying a bit corresponding to a given device. The programmable hardware logic may receive an instruction, from the BMC, to store a particular signal state. The programmable hardware logic may, responsive to receiving an instruction from the BMC, modify the signal states stored in the programmable hardware logic.

For example, the BMC may determine that a given feature should be disabled to harden the system from attack. The BMC may transmit, via the data interface, an instruction to disable that feature. Responsive to that request, the programmable hardware logic instructs the non-volatile storage to store a signal state of 1 or 0 in a table entry corresponding to that device.

The programmable hardware logic configures functionality of the system features, based on the signal states. (Operation 204). The programmable hardware logic may use a mapping, to translate a signal state to an instruction to enable or disable a system feature. The hardware logic transmits a corresponding instruction to system feature. If the feature is disabled, the feature is cut off from the rest of the system and/or prevented from functioning. If the feature is enabled, the feature may function and/or communicate with the rest of the system.

The system behaves differently if it is in lockdown configuration or non-lockdown configuration (206). Whether the system is in lockdown configuration is a matter of hardware logic, determined by whether the lockdown jumper is or is not inserted into the motherboard. Alternatively or additionally, the system can be put into lockdown or non-lockdown configuration remotely, as described below in Section 5.

If the system is in lockdown configuration, then the system disallows the signal states from being modified (Operation 210). In lockdown configuration, the lockdown jumper is inserted, which generates a disable signal, which effectively creates a hardware lock. The disable signal blocks the programming interface to the programmable hardware logic. The hardware lock prevents updates of the programmable hardware logic. Software cannot subvert the signal states. The disable signal also blocks the data interface from the BMC to the programmable hardware logic. Disabling the data interface prevents the programmable hardware logic from allowing software to modify the signal states stored in the non-volatile storage. The disable signal further prohibits the programmable hardware logic from modifying its internal hardware logic. Preventing rearrangement of the hardware logic within the programmable hardware logic prevents the programmable hardware logic from directly modifying the signal states.

If the system is not in lockdown configuration (the system is in a non-lockdown state), then the system allows the signal states to be modified (Operation 220). In non-lockdown configuration, the lockdown jumper is not inserted, which causes an enable signal to be transmitted to the programmable hardware logic. This enable signal allows the programmable hardware logic to allow software to modify the signal states stored in the non-volatile storage. An enable signal is also transmitted to the programming interface. This enable signal allows software to modify the programmable hardware logic.

For example, the system includes a signal state for one feature, a driver. The non-volatile storage stores a signal state of 1 for the driver. The programmable hardware logic retrieves this signal state of 1, corresponding to the driver. The programmable hardware logic, responsive to the retrieved signal state, maps the 1 to an enable signal. The programmable hardware logic transmits the enable signal to the driver.

The lockdown jumper is not inserted. The system is in the non-lockdown state. In this state, an enable signal is transmitted to the programming interface to the programmable hardware logic. The enable signal enables software to modify the hardware logic. For example, instructions, from the programming interface, may directly instruct the programmable hardware logic to reconfigure its internal logic to disable the driver.

In non-lockdown mode, an enable signal is also transmitted to the data interface to the BMC. This enable signal enables the BMC to modify the signal states in the non-volatile storage, by sending instructions to the programmable hardware logic via the data interface.

For example, the BMC may determine that the driver is susceptible to attack, and set its signal state to a 0. When the programmable hardware logic looks up the signal state for the driver, it sees that the signal state is 0. The programmable hardware logic reconfigures its hardware to send a disable signal to the driver. Now, the driver is disabled.

To ensure that the driver stays disabled, physical interaction with the system is required. An administrator inserts the lockdown jumper between two pins on the motherboard of the system. Insertion of the lockdown jumper puts the system into lockdown mode.

In the lockdown state, the system transmits a disable signal to the programmable hardware logic. This disable signal prevents modification of the programmable hardware logic. Software cannot instruct the programmable hardware logic to reconfigure its hardware logic to enable the driver.

The system further transmits disable signal into the programmable hardware logic, to the data interface to the BMC. This disable signal prevents the BMC from adjusting the signal states stored in the non-volatile storage by altering the function of the programmable hardware logic 110. The BMC cannot instruct the programmable hardware logic to change the signal state for the driver to a 1 (which would enable the driver). The non-volatile storage is write protected and cannot be modified.

Now, no software can reconfigure the programmable hardware logic or the signal states in the non-volatile storage. The driver will stay disabled unless the lockdown jumper is physically removed and the signal states are reconfigured.

5. Remote Reconfiguration

In an embodiment, the system can be reconfigured to and from the lockdown state remotely. Lockdown need not be asserted with a jumper. In this case, lockdown is asserted using a trusted entity in the system, which allows remote administration of the system.

To prevent unauthorized remote reconfiguration, the system includes a trusted entity. The trusted entity may be, for example, an add-in card with its own private interfaces. The trusted card is isolated from the rest of the system, and remains under control only by trusted users or devices. The trusted card may run on a simple microcontroller, to make it easy to verify that it is in a trusted state. The trusted entity manipulates signals in the system independently of the security model of the system. For example, the trusted entity can manipulate enable or disable signals, or the trusted entity can manipulate power to the system.

The trusted entity is connected to the system logic, in place of the secure jumper. The trusted entity can receive an instruction from an external source. The trusted entity may then control the transmission of an enable or disable signal, as described above.

In an embodiment, the trusted entity is communicatively coupled to a remote interface via a trusted remote connection. The trusted remote connection is private to any other interface connected to the system. The trusted remote connection may be a serial interface, and/or a network connection that only connects to a private network. By using the remote interface, an authorized user may alter the hardware configuration to or from secure mode.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 3:
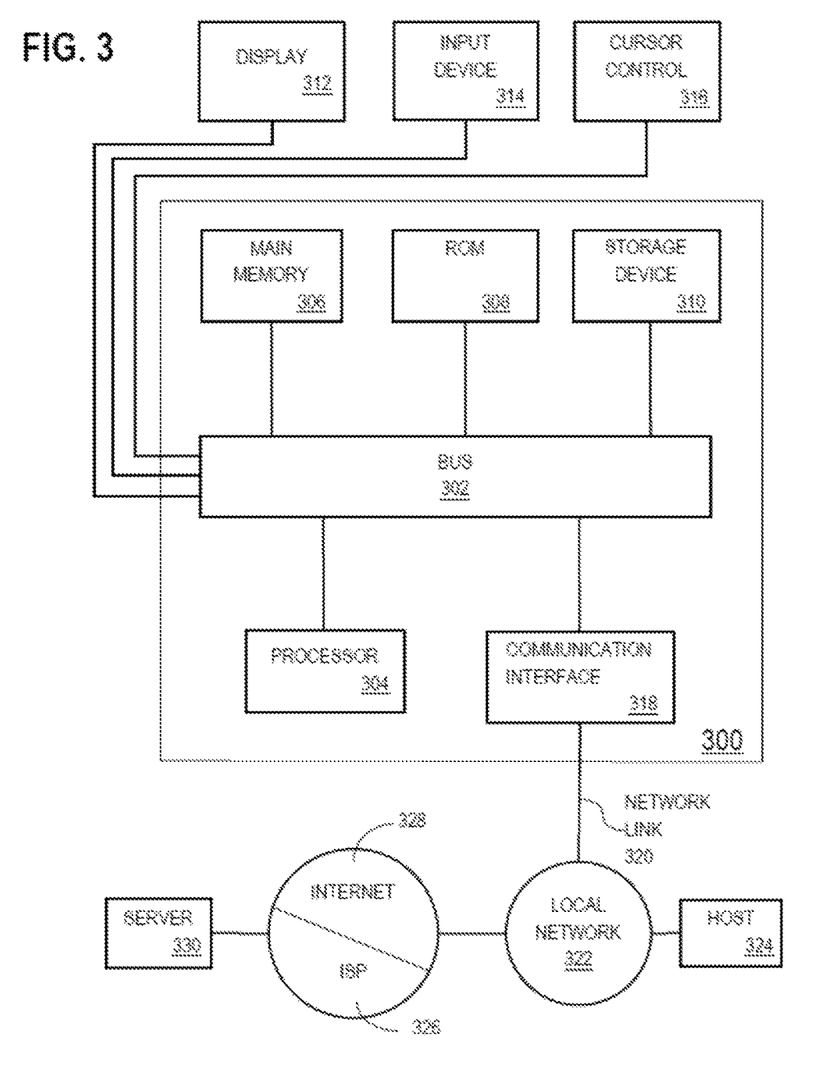
FIG. 3 illustrates a block diagram of a system in accordance with one or more embodiments.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media include, for example, optical or magnetic disks, such as storage device 310. Volatile media include dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media are distinct from but may be used in conjunction with transmission media. Transmission media participate in transferring information between storage media. For example, transmission media include coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
    non-volatile memory storing a set of signal states for signals to enable or disable functionality of each of a set of one or more system features;
    a hardware element configurable into:
        (a) a lockdown state in which the set of signal states stored in the non-volatile memory cannot be modified by a Baseboard Management Controller (BMC) connected to the non-volatile memory; and
        (b) a non-lockdown state in which the set of signal states stored in the non-volatile memory can be modified by the BMC;
    wherein a change between the lockdown state and the non-lockdown state cannot be effected without a physical manipulation of the system;
    wherein the physical manipulation of the system comprises: (a) adding a jumper to connect two pins on a motherboard comprised in the system such that the two pins are at a same voltage level or (b) removing the jumper to disconnect two pins on a motherboard comprised in the system such that the two pins are not at the same voltage level; and
    wherein the BMC is separately connected to the non-volatile memory via a connection that does not include the jumper; and
    hardware logic that:
        (a) maps the set of signal states to the signals; and
        (b) transmits the signals to enable or disable functionality of each of the set of one or more system features based on the signal states.

2. The system of claim 1, wherein the hardware logic can be reprogrammed during the non-lockdown state, and wherein the hardware logic cannot be reprogrammed during the lockdown state.

3. The system of claim 1, wherein the hardware logic comprises hardened logic that cannot be reprogrammed during either of the lockdown state or the non-lockdown state.

4. The system of claim 1, wherein the BMC includes functionality to read the set of signal states stored in the non-Volatile memory when the hardware is in the lockdown state.

5. The system of claim 1, wherein a change between the lockdown state and the non-lockdown state can be effected by remote manipulation of the system via a trusted entity comprised in the system.

6. The system of claim 1, wherein the non-volatile memory is only accessible via the hardware logic.

7. A method comprising:
    storing, in non-volatile memory of a system, a set of signal states for signals to enable or disable functionality of each of a set of one or more system features;
    configuring hardware of the system into:
        (a) a lockdown state in which the set of signal states stored in the non-volatile memory cannot be modified by a Baseboard Management Controller (BMC) connected to the non-volatile memory; and
        (b) a non-lockdown state in which the set of signal states stored in the non-volatile memory can be modified by the BMC;
    mapping, by hardware logic, the set of signal states to the signals; and
    transmitting, by hardware logic, the signals to enable or disable functionality of each of the set of one or more system features based on the signal states;
    wherein the method is performed by at least one device including a hardware processor;
    wherein a change between the lockdown state and the non-lockdown state cannot be effected without a physical manipulation of the system;
    wherein the physical manipulation of the system comprises: (a) adding a jumper to connect two pins on a motherboard comprised in the system such that the two pins are at a same voltage level or (b) removing the jumper to disconnect two pins on a motherboard comprised in the system such that the two pins are not at the same voltage level; and
    wherein the BMC is separately connected to the non-volatile memory via a connection that does not include the jumper.

8. The method of claim 7, wherein the hardware logic can be reprogrammed during the non-lockdown state, and wherein the hardware logic cannot be reprogrammed during the lockdown state.

9. The method of claim 7, wherein the hardware logic comprises hardened logic that cannot be reprogrammed during either of the lockdown state or the non-lockdown state.

10. The method of claim 7, further comprising the operation of:
    modifying, by a controller external to the hardware logic, the set of signal states stored in the non-volatile memory when the hardware is in the non-lockdown state;
    wherein the controller cannot modify the set of signal states stored in the non-volatile memory when the hardware is in the lockdown state.

11. The method of claim 10, further comprising the operation of reading, by the controller, the set of signal states stored in the non-volatile memory when the hardware is in the lockdown state.

12. The method of claim 7, further comprising the operation of enabling or disabling, by a signal, of the set of signals, a corresponding system feature, the corresponding feature comprising a device.

13. The method of claim 7, further comprising the operation of changing between the lockdown state and the non-lockdown state by remote manipulation of the system via a trusted entity comprised in the system.

* * * * *

UNITED STATES PATENT AND TRADEMARK OFFICE
CERTIFICATE OF CORRECTION

PATENT NO. : 10,585,608 B2
APPLICATION NO. : 15/466484
DATED : March 10, 2020
INVENTOR(S) : Valentino et al.

Page 1 of 1

It is certified that error appears in the above-identified patent and that said Letters Patent is hereby corrected as shown below:

In Column 11, Line 62, in Claim 4, delete "non-Volatile" and insert -- non-volatile --, therefor.

Signed and Sealed this
Twenty-seventh Day of October, 2020

Andrei Iancu
*Director of the United States Patent and Trademark Office*